(12) United States Patent
Newport et al.

(10) Patent No.: US 8,327,386 B2
(45) Date of Patent: *Dec. 4, 2012

(54) MECHANISM THAT PROVIDES MORE EFFICIENT EVENT HANDLER PROCESSING

(75) Inventors: William T. Newport, Rochester, MN (US); John Joseph Stecher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/357,695

(22) Filed: Jan. 25, 2012

(65) Prior Publication Data

US 2012/0131598 A1 May 24, 2012

Related U.S. Application Data

(63) Continuation of application No. 12/407,139, filed on Mar. 19, 2009, now Pat. No. 8,112,765, which is a continuation of application No. 11/035,553, filed on Jan. 14, 2005, now Pat. No. 7,519,974.

(51) Int. Cl.
*G06F 13/00* (2006.01)

(52) U.S. Cl. ............................................ 719/318; 718/1
(58) Field of Classification Search .................. 719/318; 718/1
See application file for complete search history.

(56) References Cited

U.S. PATENT DOCUMENTS

| | | | |
|---|---|---|---|
| 6,272,559 B1 | 8/2001 | Jones et al. | |
| 6,463,446 B1 | 10/2002 | Wollrath et al. | |
| 6,901,594 B1 | 5/2005 | Cain et al. | |
| 6,931,638 B2 | 8/2005 | Daynes et al. | |
| 7,003,768 B2 | 2/2006 | Daynes et al. | |
| 7,624,383 B2 * | 11/2009 | Barr et al. | 717/135 |
| 7,792,874 B1 * | 9/2010 | Clarke | 707/803 |
| 2002/0091874 A1 | 7/2002 | Jones et al. | |

* cited by examiner

*Primary Examiner* — Andy Ho
(74) *Attorney, Agent, or Firm* — Roy W. Truelson (57) ABSTRACT

Disclosed is an apparatus, method, service product, and program product which each provide an enhanced, registration-based event handler mechanism. Listener programs are located and compiled before notification is needed. When notification is ultimately required, the pre-located listeners can be called directly without incurring the performance expense associated with first locating and then calling each listener.

17 Claims, 5 Drawing Sheets

MECHANISM THAT PROVIDES MORE EFFICIENT EVENT HANDLER PROCESSING

CROSS REFERENCE TO RELATED APPLICATIONS

This is a continuation application of U.S. patent application Ser. No. 12/407,139, filed Mar. 19, 2009, entitled "Mechanism that Provides More Efficient Event Handler Processing", now issued as U.S. Pat. No. 8,112,765, which is a continuation of U.S. patent application Ser. No. 11/035,553, filed Jan. 14, 2005, entitled "Mechanism that Provides More Efficient Event Handler Processing", now issued as U.S. Pat. No. 7,519,974 B2, both of which are herein incorporated by reference. This application claims priority under 35 U.S.C. §120 of U.S. patent application Ser. No. 11/035,553, filed Jan. 14, 2005, now issued as U.S. Pat. No. 7,519,974, and U.S. patent application Ser. No. 12/407,139, filed Mar. 19, 2009, now issued as U.S. Pat. No. 8,112,765.

FIELD OF THE INVENTION

The present invention relates to event handler programs and, more particularly, to the efficiency of the interaction between a base event handler program and individual sub-programs responsible for handling different events.

BACKGROUND OF THE INVENTION

Computer systems are widely used to store and manipulate data. Data is stored in computer system memory and manipulated by computer system programs executing on the computer system's processor. As is well known, a processor is often thought of as the "brains" of the computer system because it is the component within the computer system that executes the computer system's programs, allowing the computer system to do real work. Nevertheless, it is really the make-up of computer system's programs that determines the variety and extent of the work which can be performed. Therefore, while the capabilities of the computer system's processor are important, the ultimate throughput of a computer system is largely determined by the performance of its programs. For this reason, computer system designers are continually looking for ways to improve program performance.

One area of focus pertains to programs known in the art as event handlers. Generally speaking, an event handler is a program that receives events from the computer system's operating system (or other facility), and takes one or more actions based on the particular type of event. A very simple example is that of a printer running out of paper. Many printers will send an event to the computer system when its paper supply has been exhausted. The computer system's operating system receives this event and forwards it to an event handler. The event handler can then "handle" the event in a manner consistent with its programming. For example, the event handler may post a message to the user or system administrator and/or the event handler may cause the computer system to sound an alarm or beep. Some event handlers, particularly older designs, are monolithic in that they are specifically written to take one or more actions based upon a particular received event. The problem with this approach is the lack of flexibility. I.e., the event handler must be rewritten whenever a new event requires handling or whenever a new action is required.

In recognition of this flexibility issue, more modern event handlers have what are referred to as "registration interfaces," which permit sub-programs to register for notification of the receipt of an event. By "sub-programs" we refer to smaller scope programs that typically have a subservient role relative to a larger program. Examples would include procedures (i.e., as used in procedural languages) and methods (i.e., as used in object-oriented languages). (In object-oriented parlance, these sub-programs are often referred to as listeners or collaborators. We make common use of the term listener in this patent.) Registering is the general act of providing sufficient information to the event handler to permit the event handler to contact the listeners at a later time. Taking the printer example, a listener might register with the event handler such that the event handler will notify it when an "out of paper" event is received. The listener would then be responsible for taking the appropriate action (e.g., a message, beep, or alarm).

Figure 1:
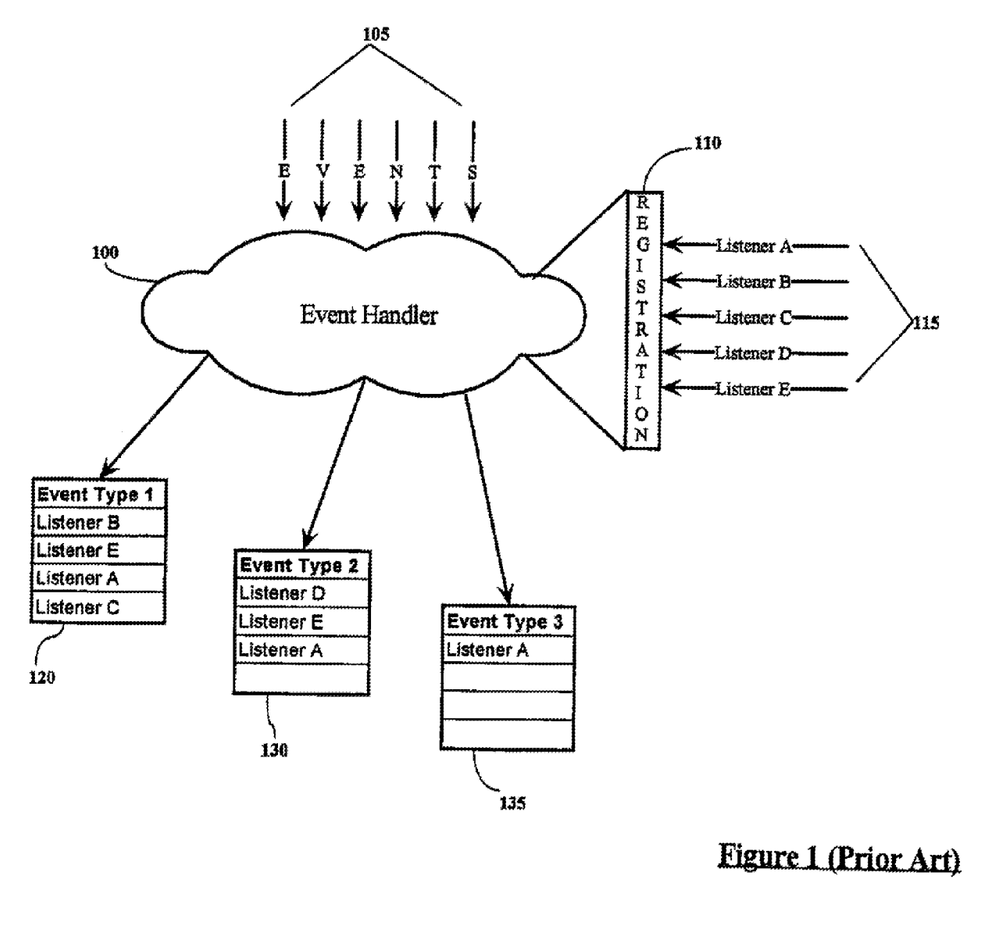
FIG. 1 shows an example design of a prior art event handler.

The flexibility gained from this approach, however, is not without cost. FIG. 1 shows an example design of a prior art event handler. As shown, Event Handler 100 includes a Registration Interface 110. Listeners, shown on FIG. 1 as Listeners 115, then utilize Registration Interface 110 to instruct Event Handler 100 to notify them when particular events (i.e., one of events 105) are received. Thus, looking at Dynamic Event Tables 120, 130, and 135, the reader can see that different events have different listeners requiring notification. For example, receipt of a Type 1 event requires notification of listeners B, E, A, and C; whereas receipt of a Type 3 event requires notification of Listener A. Registration for a given listener includes recording its location in each event table for each event for which it requires notification. Notification is then accomplished by locating the particular listener through the location information stored in the event table and then calling the particular listener. The event tables are said to be dynamic because listeners can be added or removed via Registration Interface 110.

With this as background, the flexibility cost alluded to above is attributable to the overhead associated with first locating and then calling each listener. Referring again to receipt of a Type 1 event, Event Handler 100 must first find and call (i.e., invoke) Listener B, then Listener E, then Listener A, then Listener C. Locating listeners before invoking them is quite costly from a performance perspective. Of course, full appreciation of this problem's magnitude becomes more clear when we point out that there may be tens or hundreds of listeners registered for notification of any one event. Therefore, while modern event handlers are more flexible in that event handling capability can be added through registration, the promise of this approach is limited by the performance penalty associated with locating the multiple listeners before calling them.

Without a mechanism to provide efficient registration-based event handling, the industry will continue to be faced with the choice between older, inflexible event handler designs and newer inefficient ones.

SUMMARY OF THE INVENTION

The present invention involves an apparatus, method, and program product which provides an enhanced, registration-based event handler mechanism. The method used in the preferred embodiments of the present invention involves locating and compiling each set of sub-programs before notification is needed. Then, when notification is ultimately required based upon receipt of a given event, the sub-program can be called directly without bearing the expense associated with first locating and each sub-program. Also provided by the present invention is a mechanism for creating the above-described enhanced, registration-based event handler.

The preferred embodiments of the present invention can both be implemented through use of a virtual machine. By virtual machine, we mean the well-known concept of providing an abstract (i.e., virtual) machine interface that is architecturally above a real (i.e., processor hardware) interface. As is well-understood, this approach permits programs to be written to work against the abstract interface provided by the virtual machine instead of against the actual interface provided by the processor hardware. The benefit to this approach is, of course, the ability to use the same programs on different hardware platforms that include the same virtual machine interface. The first preferred embodiment of the present invention utilizes the Java® Virtual Machine (referred to hereafter as JVM) architecture from Sun Microsystems®. The second preferred embodiment of the present invention utilizes the Common Language Runtime (CLR) of the .NET® framework, both from Microsoft Corporation®.

DESCRIPTION OF THE PREFERRED EMBODIMENT

Figure 2:
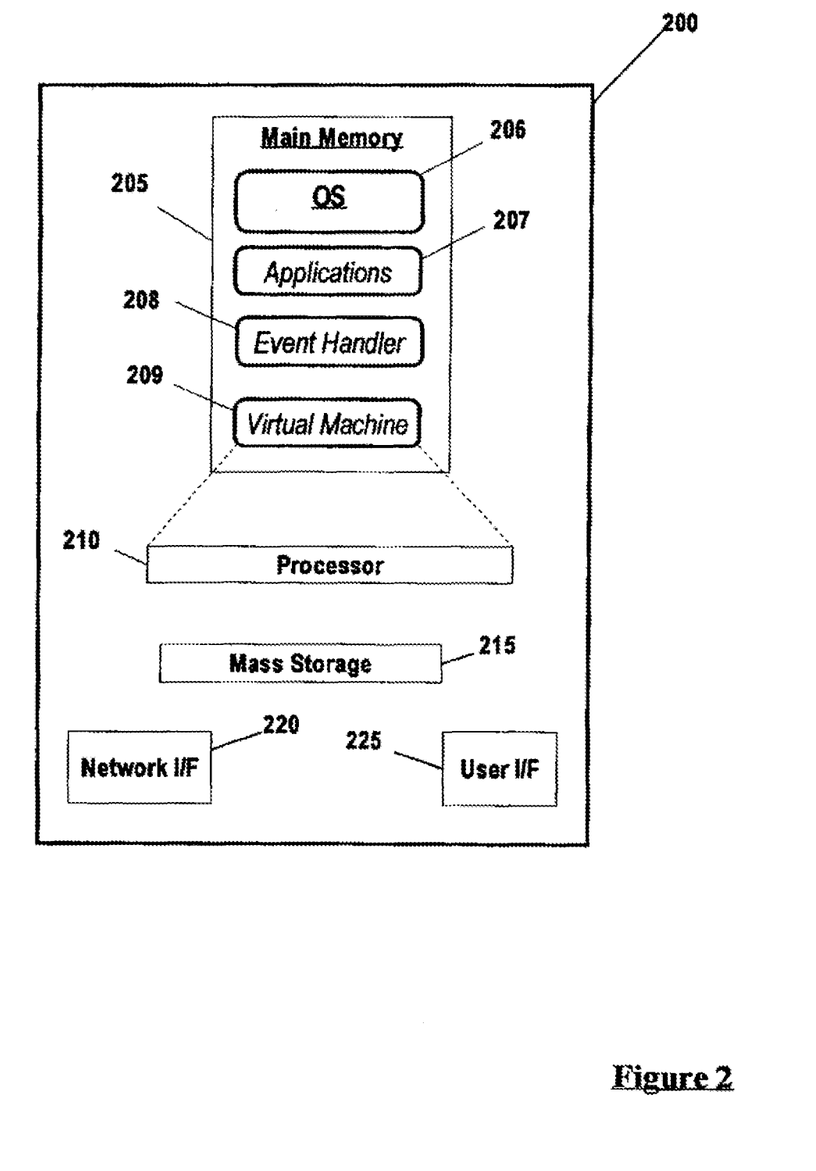
FIG. 2 is a block diagram showing a computing environment that is capable of supporting the preferred embodiments of the present invention.

Turning now to the remaining drawings, FIG. 2 shows some of the operational components used in the computing environment of the preferred embodiment of the present invention. Computer system 200 is an enhanced IBM iSeries computer system, although other computer systems could be used. Depicted components include: Main Memory 205, Processor 210, Mass Storage 215, Network Interface 220, and User Interface 225. Processor 210 is a Power PC processor used in iSeries computer systems, which is used in the preferred embodiments in the conventional way. Main Memory 205 is also used in the preferred embodiments in the conventional manner. Mass Storage 215 is used in FIG. 2 to represent one or more secondary storage devices such as magnetic or optical media. Network interface 220 is used to communicate with other computer systems, while User Interface 225 is used to accept commands and relay information to the one or more users of Computer System 200.

Shown within Main Memory 205 is Operating System 206. Operating System 206 is that known in the industry as IBM i5/OS. Shown utilizing Operating System 206 are Applications 207, Event Handler 208, and Virtual Machine 209. Applications 207 are programs that make use of the facilities provided by Event Handler 208 and Virtual Machine 209. Event Handler 208, which is explained in more detail in subsequent paragraphs, is responsible for receiving and handling events generated by Applications 207 or by some other facility. It should be noted, however, that while Event Handler 208 is shown and described herein as a separate entity, it could well be incorporated into Operating System 206, one or more of Applications 207, Virtual Machine 209, or into some other facility. Virtual Machine 209 provides an abstraction layer and runtime environment for Applications 207, and potentially any of the other facilities and programs associated with Computer System 200. As stated above, the first preferred embodiment of the present invention utilizes the JVM virtual machine, while the second preferred embodiment utilizes the CLR virtual machine.

It should be noted that while the inventors have set forth a specific hardware platform within this specification, the present invention and the preferred embodiments should be considered fully applicable to other platforms. It should be further understood that while the embodiments of the present invention are being described herein in the context of a complete system, the program mechanisms described (e.g., Event Handler 208 and Virtual Machine 209) are capable of being distributed in program product form. Of course, a program product can be distributed using different types of signal bearing media, including, but not limited to: recordable-type media such as floppy disks, CD ROMs, and memory sticks; and transmission-type media such as digital and analog communications links.

It should also be understood that embodiments of the present invention may be delivered as part of a service engagement with a client company, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

Figure 3:
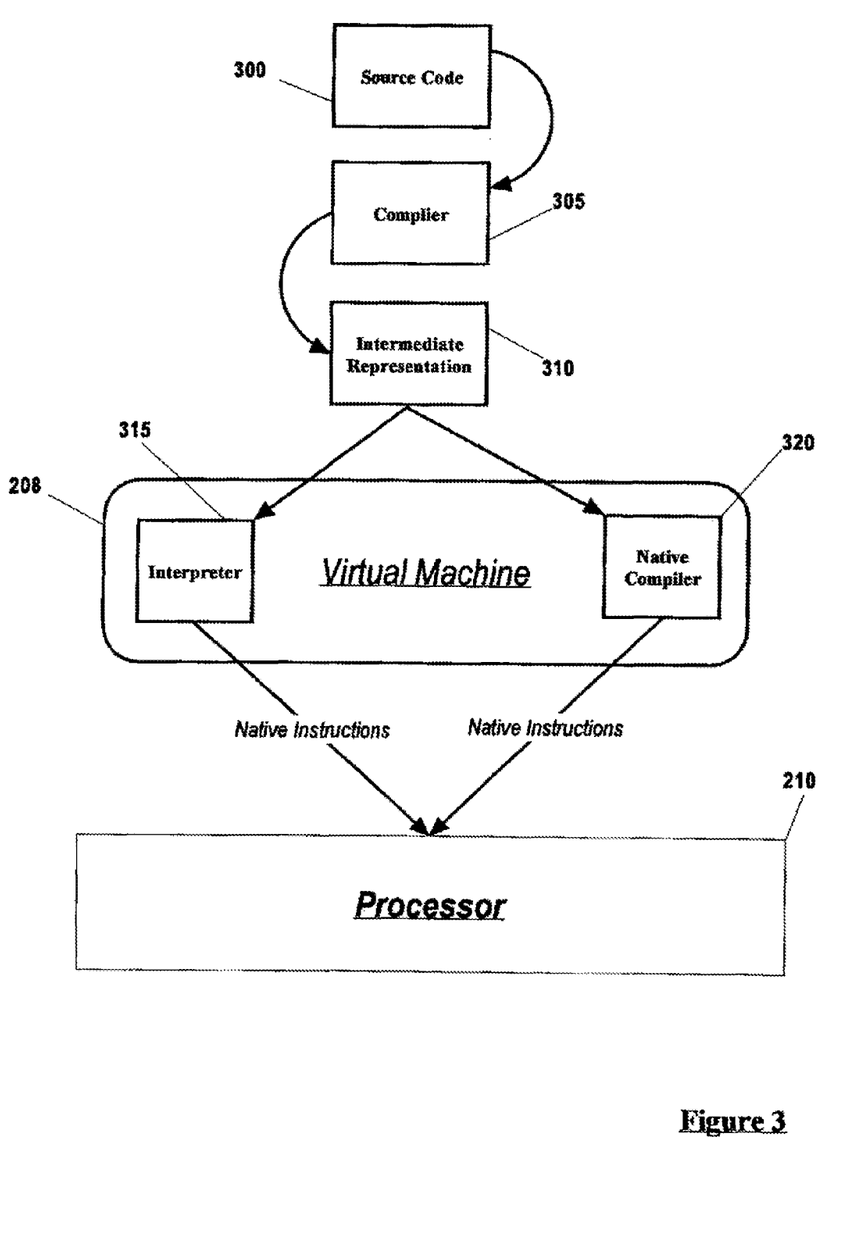
FIG. 3 is a block diagram showing the virtual machine environment used in the preferred embodiments of the present invention.

FIG. 3 is a block diagram showing a high-level view of the virtual machine environment used in the preferred embodiments. Programs, such as Applications 207 and Event Handler 208 are presented in source code form [block 300] to a compiler. For the purposes of this patent, the transformations undergone by Event Handler 208 are at issue. In the first preferred embodiment, the compiler of block 305 is that known in the industry as the Java Compiler, again from Sun Microsystems®. In the second preferred embodiment, the compiler represented by block 305 is that known in the industry as the .Net Compiler, from Microsoft Corporation®. The compilers of block 305 compile the source code of Event Handler 208 into an intermediate representation, which is represented on FIG. 3 as block 310. In the first preferred embodiment, this intermediate representation is that known in the industry as Java byte codes, again from Sun Microsystems®, while in the second preferred embodiment the intermediate representation is known as Microsoft Intermediate Language (MSIL).

At this point, the reader should note that Event Handler 208 can be utilized on other platforms (i.e., having the same virtual machine type—Java or CLR in the preferred embodiments) which do not include the enhancements of the present invention. Said another way, the applicability of Event Handler 208 to other platforms is not diminished because of the enhancements of the preferred embodiments. Continuing with this point, the intermediate representation of Event Handler 208 is compiled into native instructions by Native Compiler 320 (referring to FIG. 3) and it is Native Compiler 320 that provides/contains the enhancements of the preferred embodiments. Thus, the intermediate representation of Event Handler 208, not having undergone native compilation, is still fully usable on other virtual machines of the same type. Once compiled, Event Handler 208 can be executed on Processor 208. Interpreter 315 can also be used to convert a program's intermediate representation in a native one. While it would be possible to incorporate the benefits and advantages of the present invention into Interpreter 315, the focus here is on Native Compiler 320.

Figure 4:
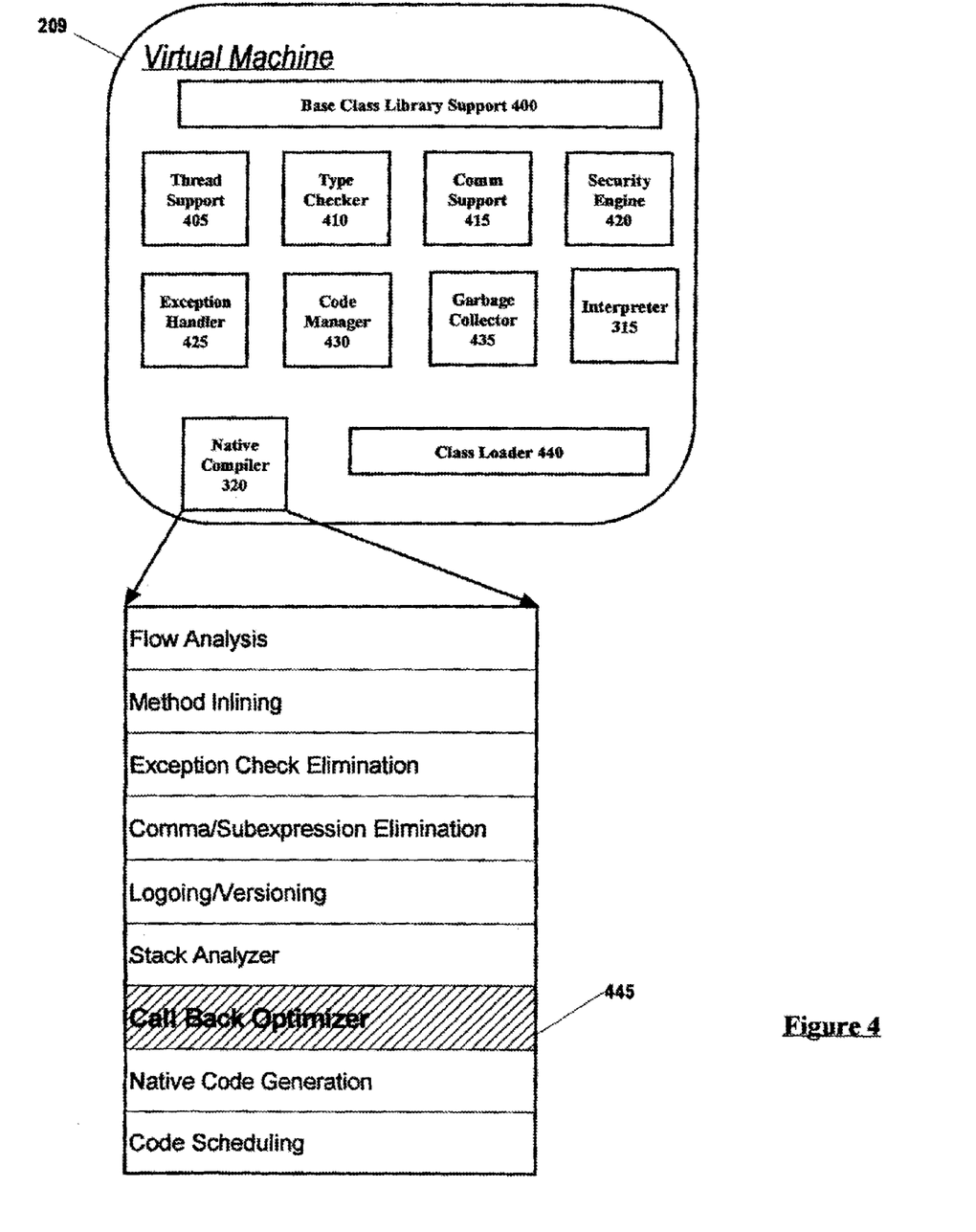
FIG. 4 is a block diagram showing an expanded view of the virtual machine architectures used in the preferred embodiments of the present invention.

Referring now to FIG. 4, shown is an expanded view of the virtual machine architectures used in the preferred embodiments of the present invention. It should be noted that we have characterized the basic virtual machine functions in generic terms so as to be applicable to both a Java implementation and a CLR implementation. Semantic differences and functional divisions aside, the majority of the functions and steps shown in the exploded view of Virtual Machine 208 are present in the standard versions of the Java and CLR virtual machines. As stated earlier, the enhancements of the present invention are made in the native compilers (shown as Native Compiler 320) of the preferred embodiments. However, other functions are also presented here for completeness.

Base Class Library Support 400

The Base Class Library Support 400 is a standard set of Application Programming Interfaces (APIs) that allow for an application to have access to commonly used data structures and methods. This support is common across all implementations of the JVM and CLR.

Thread Support 405

Thread Support 405 is used to provide Applications 207 with the ability to perform tasks in parallel by executing on multiple threads. This area of the Virtual Machine 208 provides method calls and access to specific thread related method and data structures to control application execution.

Type Checker 410

Type Checker 410 ensures that data being assigned to different pointers or being manipulated in methods (for example mathematical methods, or text processing) is of the same data type to ensure program correctness.

Communication Support 415

Communication Support 415 is the interface to the communication subsystem of Computer System 200. This allows for applications running on Virtual Machine 208 to access other computer systems or to broadcast messages across a network.

Security Engine 420

Security Engine 420 allows for applications to be implemented in a secure manner on the Virtual Machine 208. This engine controls access to specific areas of code and ensure tamper free execution. This area also interfaces with the security engine of Operating System 206 to provide features such as password verification and resource access verification.

Exception Handler 425

Exception Handler 425 allows for Virtual Machine 208 to catch user program errors and allow them to exit gracefully without destroying the system runtime as well as gather information from the error to allow the programmer to debug and fix the error.

Code Manager 430

Code Manager 430 is the mechanism in Virtual Machine 208 that manages access to the byte code or MSIL to ensure it is passed to the JIT effectively and compiled to native code when needed. It also controls loading of classes via the Classloader 440.

Garbage Collector 435

The Garbage Collector 435 manages object clean up inside of the memory space of Virtual Machine 208. This mechanism removes unused objects from the memory space, compacts objects that still have references to them, and returns a range of available memory to the Virtual Machine 208 for future object allocation.

Interpreter 315

Interpreter 315 is the mechanism that executes the Java byte code or MSIL directly without compiling it to native code via the JIT. This allows for infrequently used code to be executed without being compiled to native code if not necessary.

Class Loader 440

Class Loader 440 is the mechanism that allows for byte codes to be loaded into memory from their repository on the system disks. This allows for dynamic loading of the byte code/MSIL into memory when it is needed by Applications 207 and not before.

Still referring to FIG. 4, an exploded view of Native Compiler 320 will now be presented. It should be noted that within the preferred embodiments (i.e., Java and CLR) Native Compiler 320 is referred to as the Just In Time compiler or JIT compiler for short. The blocks shown in the exploded view of Native Compiler 320 represent the compilation steps. While a new step (shown as Call Back Optimizer step 445) has been added, other steps are shown here for completeness.

The Flow Analysis step involves statistically analyzing the code executing in Virtual Machine 208 (initially all code executed is interpreted) and then marking the most frequently executed methods and files in the byte code/MSIL for compilation to native code. Optimization is done here as well as the flow of the program is inspected and dead code is removed, loops are unrolled, etc.

The Method Inlinig step involves finding the most frequently accessed methods between classes and attempting to insert the to-be-called method directly into the caller method thus optimizing performance by eliminating the calling of the method and associated overhead of Operating System 206.

Exception Check Elimination involves analyzing programs that are to be executed on Virtual Machine 208 to determine whether one or more exception handlers can be removed, and if they can, doing so.

Common Subexpression Elimination involves removing redundant or repeated subexpressions in methods to optimize the method so that it does not perform repeated or unnecessary execution. It also optimizes out expressions that can be executed once for the length of the runtime then cached for future execution of the wrapping method Logging/Versioning involves marking loaded byte codes based on the number of passes the Flow Analysis engine has passed over it to keep track of the possibility of further improvement if necessary.

Stack Analysis involves introspection on Virtual Machine 208's stack to make sure memory usage is as optimal as possible and the stack is operating as efficiently as possible.

Figure 5:
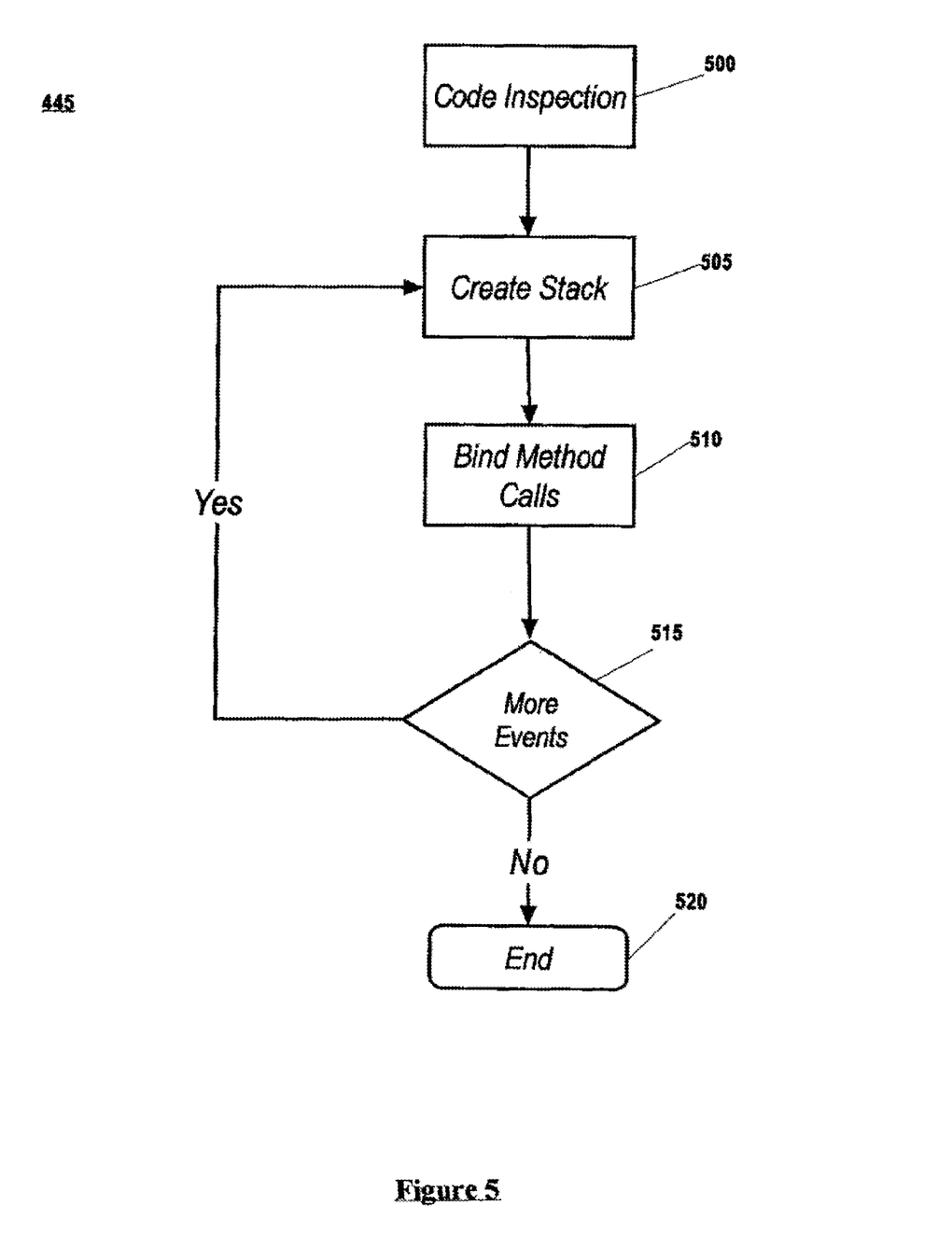
FIG. 5 is a flow diagram showing highlighted steps used to carry out the Call Back Optimizer of the preferred embodiments of the present invention.

FIG. 5 is a flow diagram showing highlighted steps used to carry out the Call Back Optimizer of the preferred embodiments of the present invention. In block 500, Call Back Optimizer 445 inspects the intermediate representation of Event Handler 208 to identify each event structure (see Event Tables of FIG. 1) handled by Event Handler 208. The event structures are then processed one by one. The first step is to remove the location identifier for each registered listener from the dynamic event structure and place it in a stack structure for later processing [block 505]. In the preferred embodiments, the event structure is the ArrayList structure, having objects stored therein. Thus the objects are removed from the ArrayList structure and stored in the stack structure.

After the stack structure has been created in block 505, Call Back Optimizer 445 traverses the stack using reflection on each object to gain access to its method calls (i.e., direct call statements). The method calls are then statically linked into the newly generated code segment [block 510]. This step thus inserts direct calls to each listener into Event Handler 208. The processing of blocks 505 and 515 is then repeated for each event structure [block 515]. After all of the event structures have been processed, Native Compiler 320 proceeds to native code generation. Returning briefly to FIG. 4, Native Code Generation follows the Call Back Optimizer steps. It is in this phase that the executable version of Event Handler 208 is created. Once made into executable form, Event Handler 208 can be scheduled for execution.

When Event Handler 208 does run on processor 210 (i.e., in this optimized form), its performance will be markedly improved because each listener can be called directly without the overhead of first determining its location. Production level testing has shown a 14% improvement in overall performance.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. Thus, the description as set forth is not intended to be exhaustive or to limit the invention to the precise form disclosed. Many modifications and variations are possible in light of the above teaching without departing from the spirit and scope of the following claims.

What is claimed is:

1. A method of optimizing a computer program, comprising the computer-executed steps of:
   receiving registration of a plurality of sub-programs to be called upon the occurrence of corresponding events in a computer system, said plurality of sub-programs being registered in an event structure which records, for each said event, a respective set of sub-programs to be called upon the occurrence of the corresponding event, each set comprising at least one sub-program;
   receiving a first version of said computer program, said computer program being capable of handling one or more said events by causing, for each said event, the respective set of sub-programs to be called;
   with respect to each of at least one event registered in said event structure, generating respective event response programming code, each respective event response programming code making a respective direct call within said computer program to each sub-program which has been registered to be notified upon the occurrence of the respective event; and
   incorporating each respective event response programming code generated by said step of generating respective event response programming code in said computer program to create a second version of said computer program.

2. The method of claim 1, wherein said computer program and said sub-programs are programs in a virtual machine environment.

3. The method of claim 2 wherein said virtual machine environment is a Common Language Runtime (CLR) virtual machine environment.

4. The method of claim 2 wherein said virtual machine is a Java Virtual Machine (JVM) environment.

5. The method of claim 2, wherein said second version of said computer program comprises executable code produced by a just-in-time (JIT) compiler.

6. The method of claim 1 wherein said computer program is an event handler program.

7. The method of claim 1, further comprising:
   creating a stack structure; and
   locating direct call statements for each of said sub-programs in said stack structure.

8. A program product for optimizing a computer program in a virtual machine environment, comprising:
   a non-transitory computer-readable medium tangibly embodying a plurality of instructions executable by a machine to perform the method comprising:
   receiving a first version of a computer program embodied as programming code in said virtual machine environment, said computer program being capable of handling one or more said events in said computer system by causing, for each said event, a respective set of sub-programs to be called, each set comprising at least one sub-program;
   accessing an event structure in which a plurality of sub-programs have been registered to be called upon the occurrence of corresponding events in said computer system, said event structure recording, for each said event, the respective set of sub-programs to be called upon the occurrence of the corresponding event;
   with respect to each of at least one event registered in said event structure, generating respective event response programming code in said virtual machine environment, each respective event response programming code making a respective direct call within said computer program to each sub-program which has been registered to be notified upon the occurrence of the respective event; and
   incorporating in said computer program each respective event response programming code generated by said generating respective event response programming code, to create a second version of said computer program.

9. The program product of claim 8 wherein said virtual machine is a Common Language Runtime (CLR) virtual machine.

10. The program product of claim 8 wherein said virtual machine is a Java Virtual Machine (JVM).

11. The program product of claim 8 wherein said computer program is an event handler program.

12. The program product of claim 8, wherein said program product comprises a just-in-time (JIT) compiler.

13. A method of optimizing a computer program in a virtual machine environment of a computer system, comprising:
   modifying a virtual machine which executes computer programs in the virtual machine environment to:
   receive a first version of a computer program embodied as programming code in said virtual machine environment, said computer program being capable of handling one or more said events in said computer system by causing, for each said event, a respective set of sub-programs to be called, each set comprising at least one sub-program;
   access an event structure in which a plurality of sub-programs have been registered to be called upon the occurrence of corresponding events in said computer system, said event structure recording, for each said event, the respective set of sub-programs to be called upon the occurrence of the corresponding event;

with respect to each of at least one event registered in said event structure, generate respective event response programming code in said virtual machine environment, each respective event response programming code making a respective direct call within said computer program to each sub-program which has been registered to be notified upon the occurrence of the respective event; and incorporate in said computer program each respective event response programming code generated by said virtual machine environment generating respective event response programming code, to create a second version of said computer program.

14. The method of claim 13 wherein said virtual machine is a Common Language Runtime (CLR) virtual machine.

15. The method of claim 13 wherein said virtual machine is a Java Virtual Machine (JVM).

16. The method of claim 13, wherein said second version of said computer program comprises executable code produced by a just-in-time (JIT) compiler.

17. The method of claim 13, wherein said computer program is an event handler program.

* * * * *